(12) United States Patent
Gumaer

(10) Patent No.: US 11,828,412 B2
(45) Date of Patent: Nov. 28, 2023

(54) SUSPENDED CEILING GRID CLAMP DEVICE AND METHOD OF FABRICATION

(71) Applicant: Lennard A. Gumaer, Bloomfield Hills, MI (US)

(72) Inventor: Lennard A. Gumaer, Bloomfield Hills, MI (US)

( * ) Notice: Subject to any disclaimer, the term of this patent is extended or adjusted under 35 U.S.C. 154(b) by 0 days.

(21) Appl. No.: 17/477,521

(22) Filed: Sep. 16, 2021

(65) Prior Publication Data

US 2022/0082207 A1 Mar. 17, 2022

Related U.S. Application Data

(60) Provisional application No. 63/079,172, filed on Sep. 16, 2020.

(51) Int. Cl.
*F16M 13/02* (2006.01)

(52) U.S. Cl.
CPC .................................. *F16M 13/027* (2013.01)

(58) Field of Classification Search
CPC ............................. F16M 13/027; E04B 9/006
See application file for complete search history.

(56) References Cited

U.S. PATENT DOCUMENTS

| | | | | |
|---|---|---|---|---|
| 2,877,974 A * | 3/1959 | Estes | ......................... | F16B 2/12 248/228.3 |
| 3,053,494 A * | 9/1962 | Stoll | ......................... | F16L 3/24 248/228.3 |
| 3,389,725 A * | 6/1968 | Tidwell | .................. | B23Q 3/005 83/444 |
| 4,826,113 A * | 5/1989 | Winters | .................... | F16L 3/24 248/228.3 |
| 5,271,586 A * | 12/1993 | Schmidt | ................ | F16B 37/046 248/68.1 |
| 8,851,196 B2 * | 10/2014 | Silcox | .................... | A62C 35/68 52/39 |
| 2005/0093764 A1 * | 5/2005 | Nugnes | .................... | H01Q 1/12 343/878 |
| 2005/0139743 A1 * | 6/2005 | Shim | ...................... | E04B 9/006 248/342 |

(Continued)

FOREIGN PATENT DOCUMENTS

JP 2019127985 A * 8/2019
KR 101876317 B1 * 7/2018

OTHER PUBLICATIONS

Stainless Fasteners stainless steel beam clamp for hanger rod item # 468 product webpage web archive dated on Jan. 29, 2018, http://catalog.fmstainless.com/item/beam-clamps/nless-steel-beam-clamps-stainless-steel-beam-clamp/268-2 (Year: 2018).*

(Continued)

*Primary Examiner* — Terrell L McKinnon
*Assistant Examiner* — Ding Y Tan
(74) *Attorney, Agent, or Firm* — Craig A. Phillips; Dickinson Wright PLLC

(57) ABSTRACT

An opposing jaw clamp configured to hang items from the grid of a suspended ceiling. The jaws are engaged by a fastening mechanism, and grip without damaging the grid. The jaws are held apart by an integral spring to allow initial placement against the rail. Then a fastening mechanism is turned to slowly compress the integral spring and close the clamping jaws against the edges of the grid rail.

13 Claims, 7 Drawing Sheets

(56) References Cited

U.S. PATENT DOCUMENTS

| | | | | |
|---|---|---|---|---|
| 2008/0174965 A1* | 7/2008 | Hsu | ................ | H05K 7/2049 |
| | | | | 361/704 |
| 2012/0097406 A1* | 4/2012 | Silcox | ................ | E04B 9/006 |
| | | | | 248/228.3 |
| 2014/0117186 A1* | 5/2014 | Govindasamy | ........ | F16M 11/16 |
| | | | | 248/317 |

OTHER PUBLICATIONS

Unistrut Atkore P2784 purlin beam clamp product webpage web archive dated on Aug. 8, 2020, https://www.unistrut.us/product-details/p2784 (Year: 2020).*

JHP Fasteners, weld fasteners product webpage web archive dated on Aug. 6, 2020, https://www.jhpfasteners.com/weld-fasteners#1 (Year: 2020).*

Unistrut P1796S frame fitting product webpage dated Sep. 12, 2008, https://www.unistrut.us/product-details/p1796s (Year: 2008).*

Anvil pipe hanger and support catalog, revision date Feb. 18, 2016 (Year: 2016).*

Globe pipe hanger beam clamp series 675, web archived dated Oct. 3, 2017, https://www.globepipehanger.com/product/series-675-steel-center-load-beam-clamp-675-103/ (Year: 2017).*

Armstrong ceiling suspension cross-tee sold on amazon dated May 21, 2019, https://www.amazon.com/ Armstrong-Ceiling-Suspension-System-Cross/dp/B07L3RJC69 (Year: 2019).*

Industrial hardware beam clamps catalog p. 43, dated 2012 (Year: 2012).*

* cited by examiner

SUSPENDED CEILING GRID CLAMP DEVICE AND METHOD OF FABRICATION

CROSS-REFERENCE TO RELATED APPLICATIONS

This application claims the benefit of U.S. Provisional Application Ser. No. 63/079,172 filed on Sep. 16, 2020, which is incorporated herein by reference in its entirety.

BACKGROUND OF THE INVENTION

I. Field of the Invention

This invention generally relates to a clamping device for supporting temporary and permanent cabling, conduit, cameras, projectors, and other apparatus from existing suspended ceiling grids. Suspended ceiling grid systems are ubiquitous in modern commercial buildings worldwide as well as some industrial or residential buildings.

II. Description of the Art

Suspended ceiling systems 2 generally are formed from tiles or panels (not shown), which may be decorative and come in a variety of shapes, sizes and colors, supported within a ceiling grid system 2. The ceiling grid systems 2 are generally comprised of an interconnected orthogonal or grid lattice of metal rail framing members 4 also known as grid rails. The grid rails 4 are commonly formed from steel or aluminum and are typically covered by a decorative coating such as white paint on the visibly exposed surfaces. The grid lattice formed by the grid rails 4 is usually attached to building structure by means of flexible steel cables or wires (not shown), and is installed to be generally level. The individual tiles or panels may be composed of sound-absorbing, insulating, fire-resistant composite materials which are then dropped into the square or rectangular grid lattice cells formed by the grid rails 4, and present a uniform ceiling surface when viewed from below although unique patterns may be used. The grid rails 4 typical have an inverted "T"-shaped or "I"-shaped beam in cross section formed from a lower decorative and visible member 6 that has a lip to support the tiles and an upper hidden member 8 that also divides the ceiling tiles. The upper member 8 may have a variety of configurations depending on the load requirements, while the lower member 6 is typically the same.

Once installed, a typical suspended ceiling system 2 obscures building structural members, leaving no easy way to temporarily or permanently support devices, fixtures, and other elements, such as video projectors, cameras, or videography lighting devices, and lightweight partitions or hangers for merchandise or marketing materials. Sometimes it is even desirable to temporarily or permanently run cabling or other building systems below the suspended ceiling. Any apparatus mounting typically requires penetrations through the ceiling tiles with threaded rod, cables, chains, or other vertical support devices to reach building structural members above the ceiling system. If apparatus requiring power or network connections is mounted above the ceiling tiles, the cables typically have to enter and exit and still leave holes or penetrations in the ceiling. Such penetrations may alter fire ratings, introduce air leaks to unconditioned plenum spaces, are unsightly, and require costly cosmetic repairs after removal, especially if the need was only temporary.

Several commercially-available clamps are available for supporting specific types of loads from ceiling grid systems. One style uses a scissor-shaped complex stamped steel assembly with a central pivot based on a threaded stud, shown in FIG. 1. Once placed on a ceiling grid rail, the scissor is compressed and the corners of the spring steel stamping snap around the grid rail. Other than the spring-steel characteristics of the stamped shape, no firm means is provided for preventing the clamp from loosening or falling off the rail while under load, especially when experiencing twisting or side loads. Such commercially available clips of this type are typically used to secure light fixtures to the ceiling grid system. Removal of the clamp requires deforming the spring steel and results in cosmetic damage to the decorative coatings on the rails, and can result in bends or dents in the rails. The engagement area of the scissor clamp is a small portion of the lower rail member, concentrating downward pulling forces in a small area on the edges, and then only two small triangles of engagement on each side of the typically aluminum material grid rail, which usually leads to deformation of the grid rail. As the grid rails extend smoothly for long lengths, any deformation is easily observed. Another issue is that the posts are all of a uniform length making it difficult to accommodate anything that isn't parallel to the ceiling. In addition, when the spring steel clamp engages the edge, the paint or coating is usually removed which is also unsightly.

Another style of clamp uses a similar scissor approach to engage the grid rail, and is furnished with an industry-standard machined post with an engagement groove for photography and videography lighting fixtures. As with the first style of clamp, other than detents stamped into the steel scissor arms, no mechanism exists to positively prevent the scissor from opening and disengaging while under load. Unexpected disengagement of either style of scissor clamp could result in serious injury to persons or damage to property, as well as cosmetic or physical damage to the grid rail itself.

SUMMARY OF THE INVENTION

The present invention addresses the shortcomings of prior art by approaching grid rail engagement from a completely different perspective. The present invention makes use of parallel clamping jaws which can be slowly engaged by a compression screw. The jaws are held apart by an integral spring to allow initial placement against the rail. Then a fastening mechanism, such as the illustrated bolt and wing nut, is turned to slowly compress the integral spring and close the clamping jaws against the edges of the grid rail. Once fully tightened, the clamp resists sliding along the rail due to friction between the jaw throat and the edges of the rail. The channel-shaped structure of the jaw prevents upward movement perpendicular to the long dimension of the rail, and carries the live load of the supported item in the downward direction.

The present invention is directed to a clamp configured to fasten to a ceiling grid rail. The clamp generally includes a pair of parallel clamping jaws that are substantially in a mirrored arrangement. More specifically the parallel clamping jaws include a first jaw plate 22 and a second jaw plate and at least one inner jaw plate, but preferably an inner jaw plate for each of said first and second jaw plates.

The first jaw plate 22 has a first main body portion 28 and first upper inwardly extending leg 90 and a first inwardly extending lower leg 24, each extending from opposing ends of the first main body portion 28. The second jaw plate 30 has a second main body portion 38 and a second upper inwardly extending leg 80 and a second inwardly extending lower leg 32, each extending from opposing ends of the second main body portion 38 and wherein the second inwardly extending lower leg 32 includes a lower fastener mechanism 60.

The at least one inner jaw plate includes an inner jaw plate main body portion 72 and an inner jaw tooth portion 80 extending from an end of the inner jaw plate main body portion 72, and wherein the inner jaw plate main body portion is aligned with and coupled to at least one of the first main body portion 28 or second main body portion 38 and wherein the inner jaw tooth portion 80 is aligned with at least one of the first upper inwardly extending leg 90 or the second upper inwardly extending leg.

The clamp further includes a fastener mechanism configured to secure the first jaw plate, the second jaw plate and the at least one inner jaw plate together to form the clamp. The fastener mechanism includes a bolt 42, a nut 48 and a spring 50 and wherein the bolt 42 passes through a first hole 26 on the first jaw plate 22 and a second hole 34 on the second jaw plate 30. The fastener mechanism 40 further includes a spacer 52, configured to prevent the first jaw plate 22 and second jaw plate 30 from deforming the grid rail. The spacer 52 is located around the bolt 42, and the spring 50 is located around the spacer 52.

The first inwardly extending lower leg 24 defines a hole 64 aligned with the lower fastener mechanism 60 to allow passage of the hanger bolt to the lower fastener mechanism. The lower fastener mechanism 60 is typically a nut secured to the second inwardly extending lower leg, such as by welding.

At least one of the first and second holes on the first and second jaw plates is square, and wherein the first hole 26 is located on the first main body portion 28, and the second hole 34 is located on the second main body portion 38. The at least one jaw plate 70 includes a rectangular hole and the second inner jaw plate 70 includes a round hole.

The jaw plates may include a protective coating, such as on the inner jaw teeth 80 and outer jaw teeth 90.

The clamp includes a lateral axis and a perpendicular longitudinal axis wherein the longitudinal axis is typically aligned with the long direction of the ceiling grid, or more specifically the lower and hidden members 6, 8, to which it is coupled either directly or indirectly. The longitudinal length of the first and second jaw plates is at least three times the lateral length of each of the first and second upper inwardly extending legs 80, 90, and wherein the fastener mechanism has an fastener axis aligned laterally. In addition, the clamp further includes a hanger bolt having a hanger bolt axis and wherein the hanger bolt is coupled to the lower fastener mechanism and wherein the hanger bolt axis is perpendicular to both the lateral axis and the longitudinal axis.

The present invention is also directed to a clamp configured to fasten to a ceiling grid rail having a lower decorative member with a first side and a second side. The clamp includes a first jaw plate 22 having a first main body portion 28 and first upper inwardly extending leg 90 and a first inwardly extending lower leg 24, each extending from opposing ends of the first main body portion 28; a second jaw plate 30 having a second main body portion 38 and a second upper inwardly extending leg 80 and a second inwardly extending lower leg 32, each extending from opposing ends of the second main body portion 38 and wherein the second inwardly extending lower leg 32 includes a lower fastener mechanism 60 and wherein the second inwardly extending lower leg 32 is longer and extends closer proximate to the first jaw plate 22 than the second upper inwardly extending leg 80; a first inner jaw plate arranged proximate to the first jaw plate 22 and a second inner jaw plate arranged proximate to the second jaw plate 30.

Each of the first inner jaw plate and the second inner jaw plate include an inner jaw plate main body portion 72, which defines at least one hole, and an inner jaw tooth portion 80 extending from an end of the inner jaw plate main body portion 72, and wherein the inner jaw tooth portion on the first inner jaw plate is aligned with the first upper inwardly extending leg 90 defining a first cavity for receiving a first side of the grid rail, and wherein the inner jaw tooth portion on the second inner jaw plate is aligned with the second upper inwardly extending leg 90 on the second jaw plate 30 to form a second cavity configured to receive the opposing second side of the grid rail; and a fastener mechanism including at least one bolt, a nut, a spring and a sleeve, and wherein the bolt passes through both of the first and second jaw plates and the spring and spacer are both located between the jaw plates.

DETAILED DESCRIPTION OF INVENTION

Figure 1:
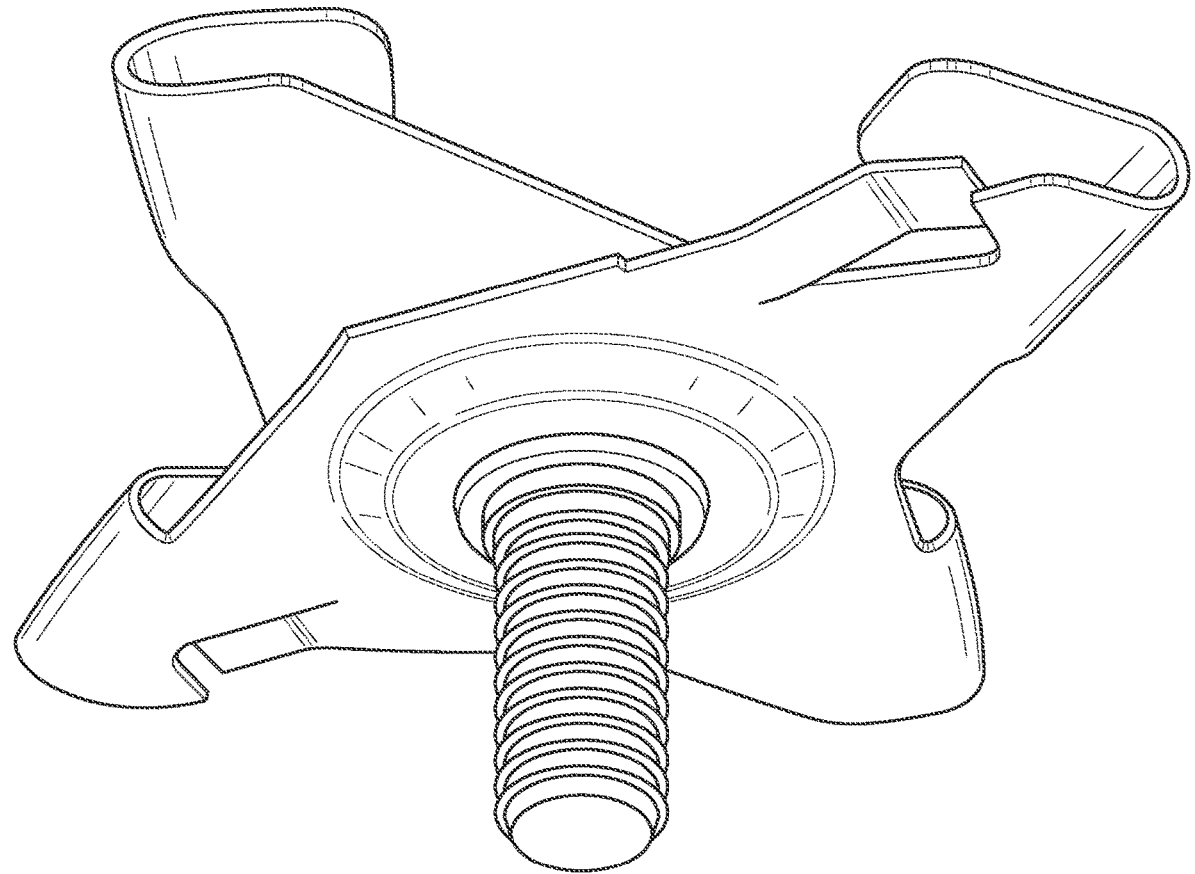
FIG. 1 is exemplary commercially-available prior art scissor-type clamp.

The present invention is directed to a clamp 10 having a pair of parallel clamping jaws 20 which can be slowly engaged by a fastening mechanism 40. The jaws 20 are held apart by an integral spring 50 to allow initial placement against the rail 4 during installation of the clamp 10 onto a rail 4. Then a fastening mechanism 40, such as the illustrated wing nut 48, is turned to slowly compress the integral spring 50 and close the clamping jaws 20 against the edges of the grid rail 4. Once fully tightened, the clamp 10 resists sliding along the rail due to friction between the surfaces of the parallel clamping jaws 20 and the edges of the rail 4, and allows the support of much heavier objects than previously possible while minimizing any cosmetic or structural damage to the rail 4. The channel-shaped cavity 12 formed by each parallel clamping jaw 20 prevents upward movement perpendicular to the long dimension of the rail 4, and carries the live load of the supported item in the downward direction.

The primary components of the clamp 10 include the parallel clamping jaws 20 which generally include a first jaw plate 22 and a second jaw plate 30. The first jaw plate 22 may also be referred to as an outer jaw plate and the second jaw plate 30 may be referred to as an inner jaw plate, as when the parallel clamping jaws 20 are assembled, the second or inner jaw plate has a lower leg 32 that fits within the decorative lower leg 24. Of course the arrangement of what jaw plate 22, 30 fits within the other jaw plate 22, 30 may be reversed.

Each of the jaw plates 22,30 include an inwardly extending leg or outer jaw tooth 90 or inner jaw tooth 80, such when assembled the upper portion of the jaw plates 22, 30 are generally mirror images of each other, although some differences, such as length of the legs, the additional of a lower fastener mechanism 60, or even the presence, absence or size or configuration of hole may occur to prevent an exact mirror image.

The length of the jaw plates 22, 30 may vary depending on the desired load to be carried. The jaw plates 22, 30 also include a main body portion 28, 38, specifically a first main body portion 28 and a second main body portion 38, extending between the jaw tooth 80, 90 and an inwardly extending lower leg, specifically a decorative lower leg 24 on the first jaw plate 22, and a second lower leg on the second jaw plate 30. While the length of the lower legs 24, 32 may vary, it is generally expected for a pleasing look that the decorative lower leg 24 is slightly longer than the inwardly located second lower leg 32.

Figure 6:
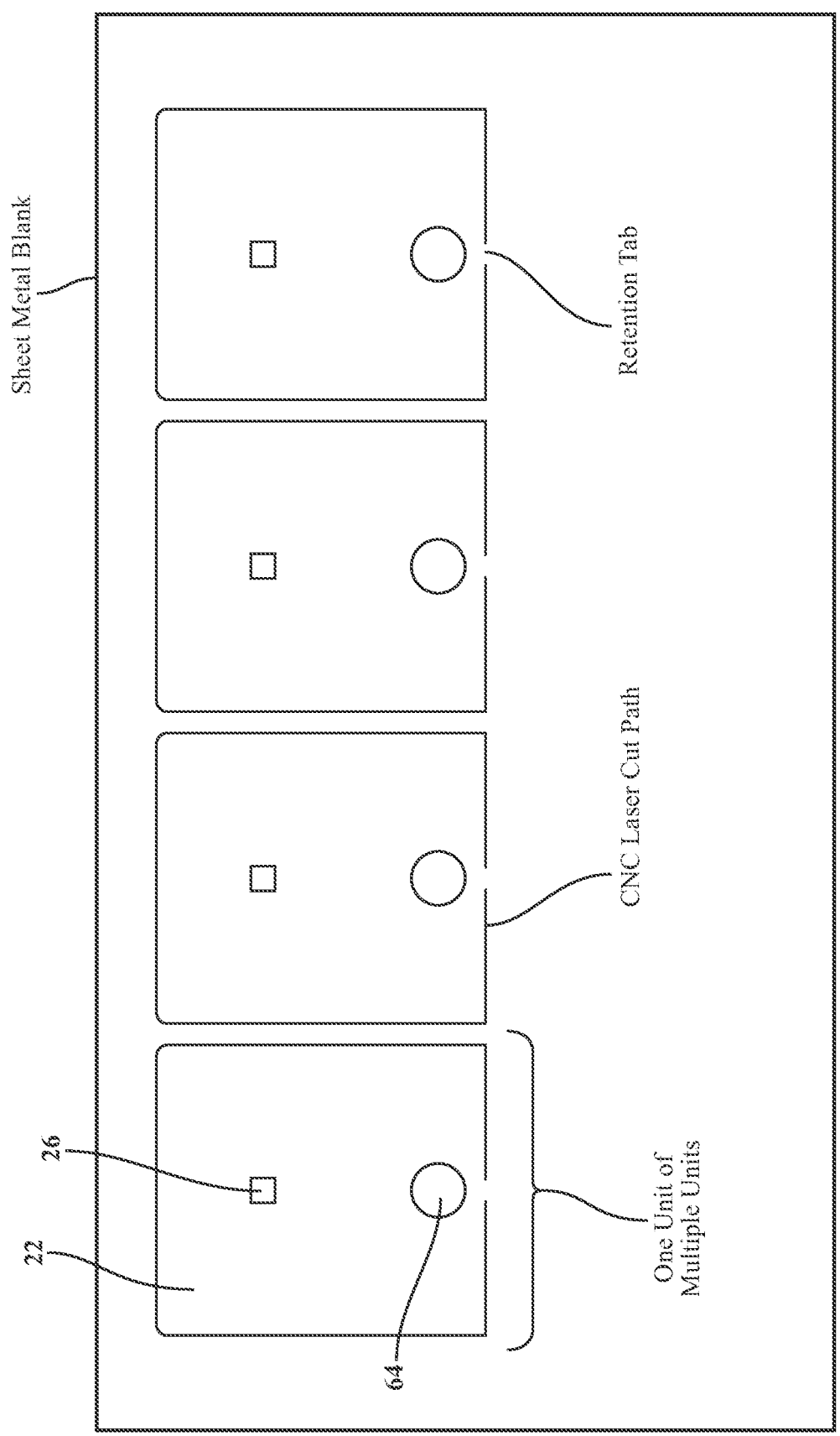
FIG. 6 is a diagram showing CNC laser machine cutting path in sheet metal, including skeleton method retention tabs of the first jaw plate, allowing multiple clamp components to be fabricated efficiently.

At least one of the lower legs 24, 32, typically the second lower leg includes a lower retention mechanism 60, capable of receiving a stud from which various objects may be suspended. The lower retention mechanism 60 may simply be a punched and threaded portion of the lower leg or for example a weld nut 62. The lower retention mechanism being on the inward of the two lower legs 24, 32 and passing through a hole 64, as best illustrated in FIG. 6, on the other of the two legs 24, 32, specifically the second lower leg 32, it prevents the clamp 10 from opening under load as the bottom of the jaws 20 cannot move inward or outward relative to each other enough, which would allow release of the jaw teeth 80, 90 from the rail.

Figure 5:
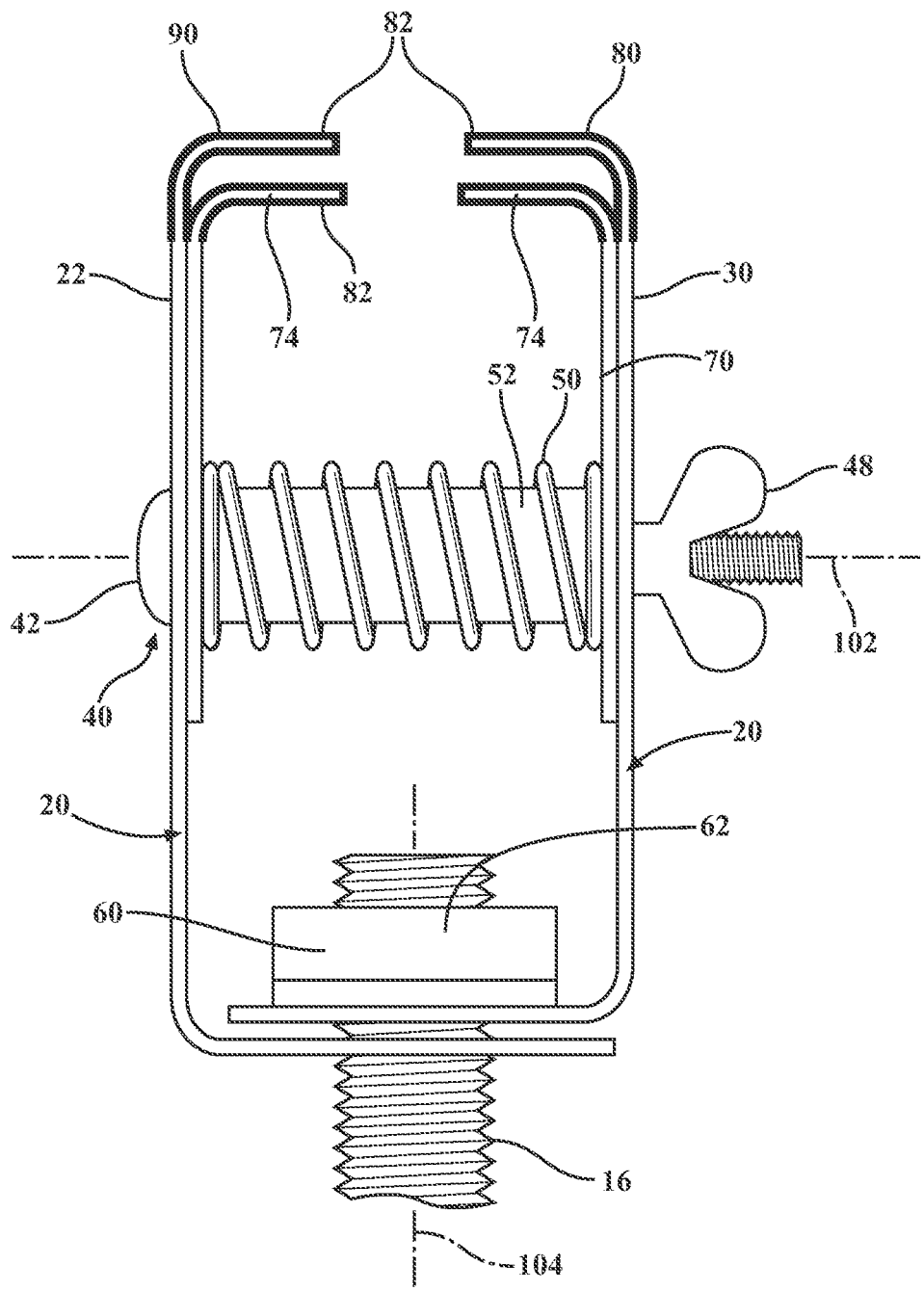
FIG. 5 is a front view of the clamp of FIG. 2, including the fastening mechanism.

An inner jaw tooth plate 70 may be in engagement with one of the first and second jaw plates 22, 30, or each of the first and second jaw plates 22, 30 may be adjacent to an inner jaw tooth 80, as illustrated in FIG. 5. While the inner jaw tooth plates 70 are illustrated as having a similar axial length along the rail as the jaw plates 22, 30, they may be formed with different length, such as the inner jaw tooth plates 70 being shorter in length. The inner jaw tooth plates 70 also include inner jaw plate jaw teeth 74 that extend inwardly from an inner jaw plate body 72 to engage the top of any rail 4. The jaw teeth 74 may be coated with a protective coating 82 as described below.

The inner jaw teeth 80 and outer jaw teeth 90 are formed to define a cavity 12, with the inner jaw plate teeth 74, which is generally sized to the thickness of most rails 4. The protective coating 82 may also allow for a scratch free compressive engagement when the fastening mechanism 40 is tightened. However, from the configuration of the clamp 10, the clamp does not need to rely on compressively engaging the thickness of the rail 4 between the jaw teeth 80, 90 and the inner jaw plate body teeth 74.

The jaws 80, 90, and inner jaw plate body teeth 74 may be dipped in a polymer or rubberized protective coating, or have adhesively applied materials in the areas that engage the grid rail, to provide a surface that is soft and minimizes risk of mechanical damage to the grid rail 4. While FIG. 5 illustrates both jaw teeth 80, 90 being coated, only the inner jaw teeth 74 on the inner jaw plate 70 truly benefit from a protective coating 82 to prevent scratches to the rail 4. The unique slow parallel engagement of the jaws 80, 90 with the rail allows the rail 4 to be easily and securely clamped without scratching or other cosmetic damage, and coating the jaws 80, 90 further prevents sliding of the clamp 10 along the rail 4.

To remove the clamp 10, any attached live load is first removed, then the fastening mechanism 40 is released to open the clamp 10, such as the wing nut 48 on the compression screw or bolt 42 being slowly loosened until the jaws 20 are sufficiently opened to clear the rail and allow the clamp 10 to be gently removed sideways from the rail 4.

The clamp 10 allows a wide range of loads to be attached to the bottom of the clamp 10 using the retention mechanism or lower fasteners 60 such as a standard screw or bolt with a variety of thread diameters and pitches engaging the nut 62. The load attachment point generally includes a stamped and threaded portion or a threaded nut insert, either mechanically restrained or welded to the inner jaw plate. The comparatively wider jaw engagement surface on the jaw teeth 80, 90, as compared to prior art scissor-style clamps, distributes the attached load evenly over a larger area of the grid rail, reducing risk of deforming or bending the rail flanges. The length of the clamp may vary, which allows the clamp in certain configurations to have longer surface area engaged with the grid rails and as such provide even more engagement surface area. Unlike prior clamps described above, the present invention clamps 10 attach so securely that generally the ceiling grid 2 fails before the clamp 10 releases. However, to support additional weight, the ceiling grid rails 4 may be supported above each clamp 10, allowing the grid 2 clamp 10 combination to support very heavy loads not previously possible.

Figure 2:
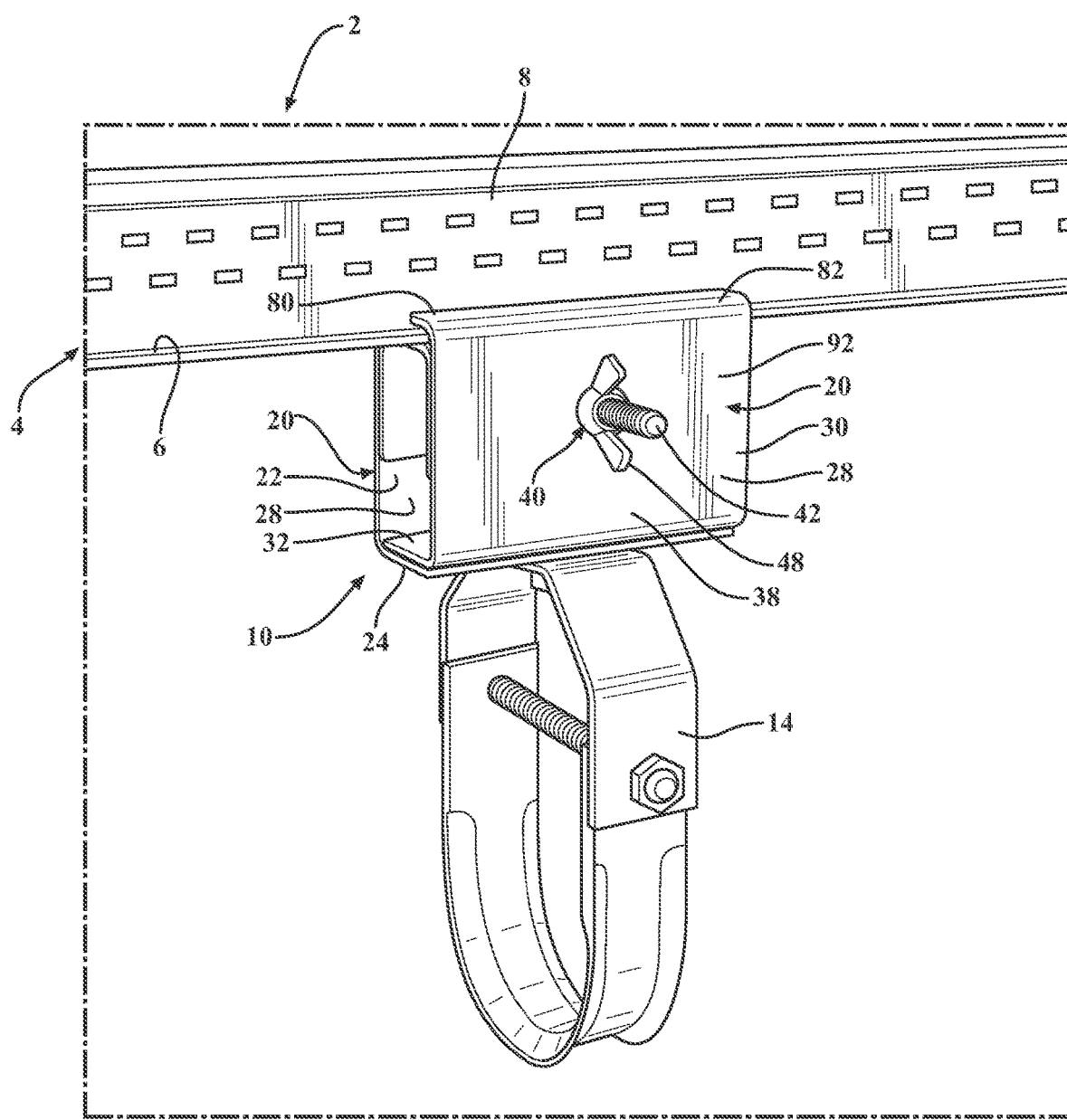
FIG. 2 is a right side perspective view of the clamp engaging an exemplary grid rail and supporting an exemplary load of a commercially-available clevis hanger.

FIG. 2 illustrates an exemplary clamp 10 coupled to a typical ceiling grid rail 4, and an exemplary hanger 14 coupled to the clamp. The hanger 14 may be coupled to the clamp 10 using a hanger bolt 16 as illustrated in FIG. 6 The hanger 14 or fixture support coupled to the clamp 10 may vary widely depending on the type of item to be supported and its size, shape and configuration. In FIG. 2, the clamp 10 is illustrated without the anti-marring material 82, such as a polymer or rubberized protective coating, applied on the jaws. However, even without the protective coating 82, the configuration of the clamp 10 relative to the grid rails, specifically the jaws 80, 90 engaging the grid rail 4 generally prevent marring of the grid rail 4. In FIG. 5, the protective material 82 may be seen on the jaws 80, 90.

Figure 3:
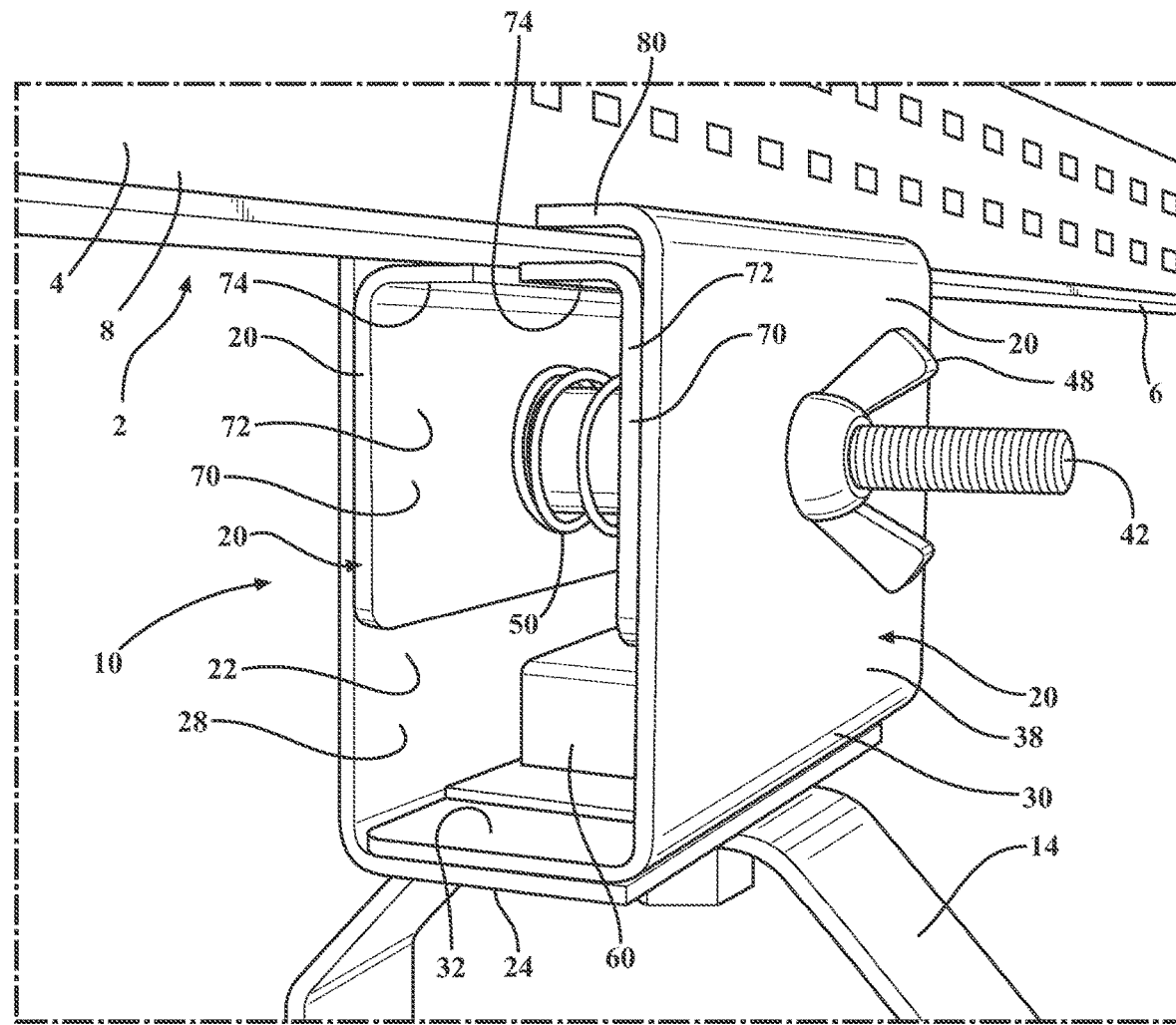
FIG. 3 is a front perspective view of the clamp of FIG. 2 engaging the grid rail.

FIG. 3 illustrates an exemplary clamp 10 affixed to a typical ceiling grid rail 4, with a commercially-available clevis hanger 14 as the attached load, viewed from long dimension of the grid rail 4. The clamp 10 is shown without any finishing material, such as paint or anti-marring material 82 applied to clearly show the function and configuration of the claims.

Figure 4:
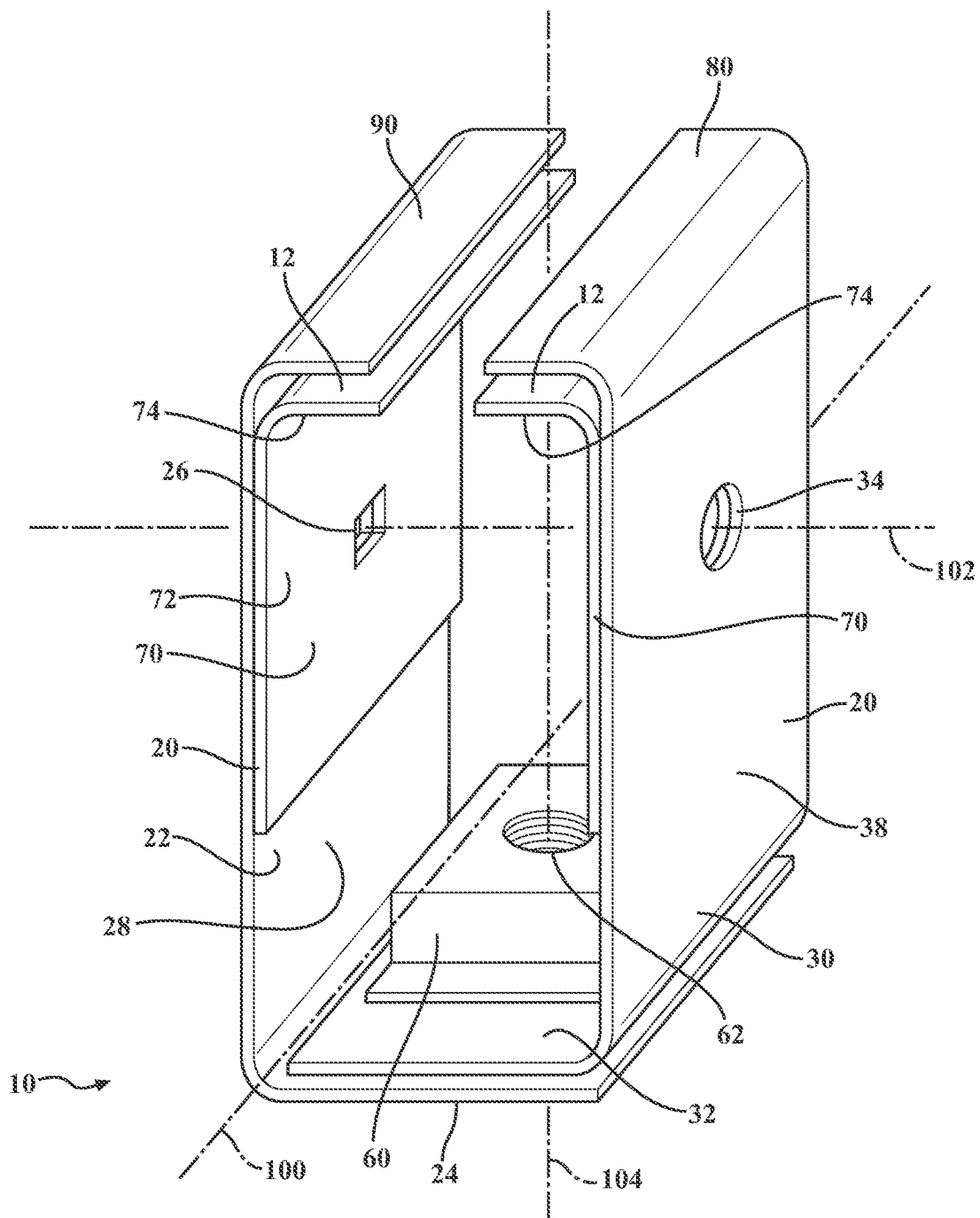
FIG. 4 is a front perspective view of the clamp of FIG. 2 with the fastening mechanism removed.

FIG. 4 is a front perspective drawing of the clamp of FIG. 2, illustrating the assemblage of the inner and outer jaw plates 22, 30, inner jaw plates 70, and exemplary threaded fastener mechanism 40. For clarity, some components are not shown in FIG. 4.

FIG. 5 shows the same exemplary clamp of FIG. 4 from a front view, showing fastening mechanism 40, the compression screw or bolt 42 and wing nut 48 used to tighten and loosen the clamping force of the clamp jaws 20, along with the compression spring 50 and optional spacer 52. The optional anti-marring protective coating 82 is also illustrated on the jaw teeth 80, 90 as well as inner jaw plate teeth 74.

The body of the clamp 10 is fabricated from mild sheet steel, although it could also be assembled from galvanized steel, stainless steel, or aluminum sheet, or other materials, or formed from other methods, depending upon specific application requirements. In some embodiments, the body or jaws 20 of the clamp 10 may be formed from resin or polymeric materials, which may also be extruded or stamped. The clamp 10, as illustrated generally includes nine primary components, plus a few secondary components.

Secondary components generally include the fastening mechanism 40, which is illustrated in FIG. 5 as a carriage bolt 42, a wing nut 48, compression spring 50 and a cylindrical spacer 52, assembled into the sheet metal components of the clamp 10. The fastening mechanism 40 may have other components substituted, as well as it may have other configurations. The outer or second jaw plate 30, as illustrated, defines a square hole 26 to engage the square shank of the carriage bolt 42 to prevent counter-rotation when the wing nut 48 is tightened or loosened. Of course, the outer or second jaw plate 30 may be formed without the square hole, such as the illustrated round hole 34 in the opposing $2^{nd}$ jaw plate 30 and other mechanisms for securing the rotation of a bolt may be used, such as the carriage bolt may be replaced with a hex head or other bolt, or a self-clinching or welded stud-type fastener. It should be noted that if the $1^{st}$ jaw plate 22 includes the rectangular hole 26, the inner jaw plates 70 on the inner jaw plate body 72 should include a rectangular hole as well.

The compression spring 50 provides controlled tension to hold the jaws aligned when the wing nut is fully loosened, and provides tactile resistance as the wing nut 48 is tightened. The spring 50 also applies force to the base of the wing nut 48 to resist self-loosening caused by vibration, similar to the behavior of a spring-type lock washer. Of course, a nylon lock washer nut may also be used.

The cylindrical spacer 52 provides three functions: (1) it occupies the space between the outer diameter of the threaded carriage bolt, and the inner diameter of the spring coil, helping keep the spring 50 centered on the carriage bolt 42 and situated perpendicular to the inner jaw plate 70 faces (although a smaller diameter spring may be used without the cylinder); (2) it functions as a limiter to prevent over-tightening of the jaw plates against the grid rail; and (3) it provides a third point of contact between the parallel clamping jaws 20 to increase the clamping ability. Over-tightening the wing nut 48 would apply excessive force to the jaw plates 20 and could lead to scratching or crushing of the grid rail 4. Under normal usage conditions and tightening by hand without tools, the spacer very effectively sets the minimum spacing between the inner jaw 70 faces, and thus limits the force applied to the edges of the grid rail 4. The clamp 10 may be formed without the spacer as well, and the length of the spacer 52 may change to accommodate different grid rail 4 dimensions.

The completed clamp 10 assembly is typically finished with a water or solvent-based paint or powder-coat finish in a flat neutral white color. Other colors or types of coatings, including electroplating or conversion coatings, may be used in order to harmonize the appearance of the clamp 10 with the ceiling grid and ceiling panels for aesthetic reasons. Once finished, the jaw teeth 80, 90 may be coated with a protective polymer 82 or rubberized coating to provide a soft engaging surface on all areas that contact the grid rail 4. The coating protects the grid rail 4 from cosmetic and mechanical damage during clamp placement and removal. Certain applications may not require the additional rubberized coating.

Because of the inherent simplicity of the clamp's components, the clamp 10 may readily be constructed without complex stamping dies and machining processes, contributing to commercial success and wide adoption due to low manufacturing cost. The clamp has a longitudinal axis 100 generally aligned with the length of the clamp body in its elongated dimension, and also aligned with the grid rail in its elongated direction when installed, a lateral axis 102 perpendicular to the longitudinal axis 100 and a hanger axis 104 perpendicular to the longitudinal axis 100 and lateral axis 102 as illustrated in the figures.

The parallel clamping jaws 20, such as the jaw plates 22, 30 and inner jaw plates 70 can be grouped in multiplex panels on a single material blank sheet, such as a steel sheet, and cut out by a laser CNC machine, a technique known as "skeleton machining". Perforations or retention tabs allow the individual pieces to remain grouped during subsequent steps of the manufacturing process, such as bending in a press brake machine. Once fully formed, the individual components can be manually or automatically separated by repeated fatigue bending to crack the material cleanly along the perforation line. The perforations are arranged in a manner such that the exposed corners are laser cut radii to produce a clean edge, and the fatigue-bend separation areas are on the inner portions of the component where they are away from incidental contact by human hands, such as during assembly or installation placement.

Figure 7:
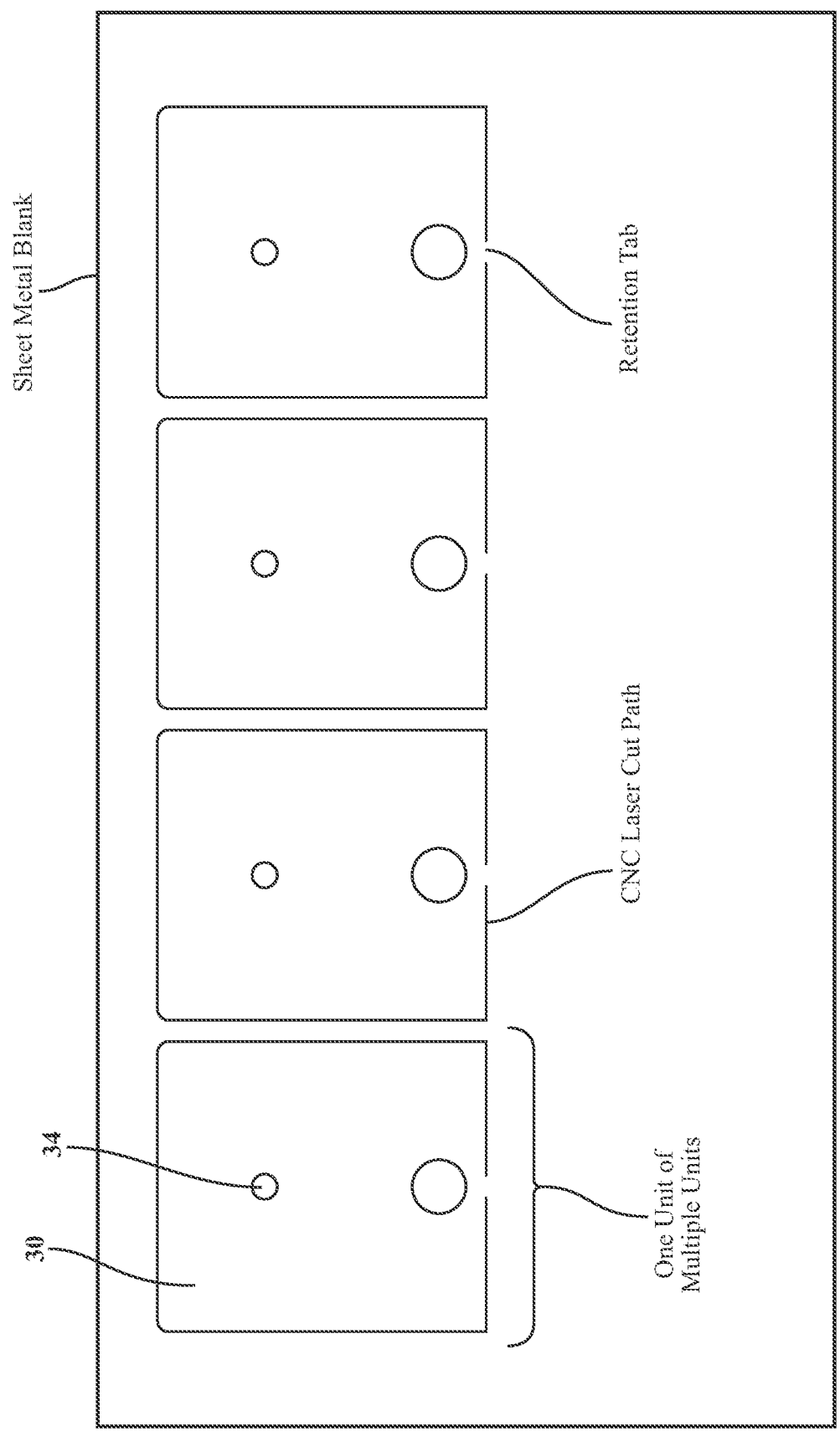
FIG. 7 is a diagram showing CNC laser machine cutting path in sheet metal, including skeleton method retention tabs of the second jaw plate, allowing multiple clamp components to be fabricated efficiently.

FIGS. 6 and 7 show an exemplary multiplex panel scheme for multiple jaw plates, specifically the first or outer jaw plate 22. Minimal deburring operations are required on the laser-cut components, reducing manual handling of components and thus manufacturing cost.

The configuration of the clamp, specifically the parallel clamping jaws 20, and the hanging bolt allows, once the hanging bolt is installed and tightened, for the carriage bolt to be removed or the fastening mechanism to be loosened, while the jaws 80, 90 maintain contact and engagement between the ceiling grid 4 and the clamp 10. This is a safety mechanism that ensures that even if the fastening mechanism 40 or wing nut 48 on the carriage bolt 42 becomes loose, the configuration of the jaws 80, 90 and the hanging bolt ensures the clamp cannot become disengaged from the grid rail 4 easily while under load.

In the above description, details are set forth to provide an understanding of the present disclosure. For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure.

It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or feature is referred to as being "on," "engaged to," "connected to," "coupled to" "operably connected to" or "in operable communication with" another element or feature, it may be directly on, engaged, connected or coupled to the other element or layer, or intervening elements or features may be present. In contrast, when an element is referred to as being "directly on," "directly engaged to," "directly connected to," or "directly coupled to" another element or feature, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly and expressly indicated by the context. Thus, a first element, component, region, layer or section discussed below could be termed a second element, component, region, layer or section without departing from the teachings of the example embodiments.

For purposes of description herein, the terms "upper," "lower," "right," "left," "rear," "front," "vertical," "horizontal," and derivatives thereof shall relate to the invention as oriented in the FIGS. However, it is to be understood that the present disclosure may assume various alternative orientations and step sequences, except where expressly specified to the contrary. It is also to be understood that the specific devices and processes illustrated in the attached drawings, and described in the following specification are exemplary aspects of the inventive concepts defined in the appended claims. Hence, specific dimensions and other physical characteristics relating to the aspects disclosed herein are not to be considered as limiting, unless the claims expressly state otherwise.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

I claim:

1. A clamp configured to fasten to a ceiling grid rail, said clamp comprising
    a first outer jaw plate having a first main body portion and first upper inwardly extending leg and a first inwardly extending lower leg, each extending from opposing ends of said first main body portion;
    a second outer jaw plate having a second main body portion and a second upper inwardly extending leg and a second inwardly extending lower leg, each extending from opposing ends of said second main body portion and wherein said second inwardly extending lower leg includes a lower fastener mechanism and wherein each of said second upper inwardly extending leg and said second inwardly extending lower leg extend from the second main body portion toward said first outer jaw plate, and each of said first upper inwardly extending leg and said first inwardly extending lower leg extend from the first main body portions toward said second outer jaw plate;
    a first and second inner jaw plate each including an inner jaw plate main body portion and an inner jaw tooth portion extending from an end of said inner jaw plate main body portion, and wherein said inner jaw plate main body portion of said first inner jaw plate is aligned with and coupled to said first outer jaw plate, specifically said first main body portion on said first outer jaw plate, and said second inner jaw plate is aligned with and coupled to said second outer jaw plate, specifically, said second main body portion and wherein said inner jaw tooth portion of said first inner jaw plate is aligned with said first upper inwardly extending leg of said first inner jaw plate and said inner jaw tooth portion of said second inner jaw plate is aligned with said second upper inwardly extending leg of said second outer jaw plate; and
    a fastener mechanism configured to secure said first outer jaw plate and said first inner jaw plate, said second outer jaw plate and said inner jaw plate together to form said clamp.

2. The clamp of claim 1 wherein said first inwardly extending lower leg defines a hole aligned with said lower fastener mechanism.

3. The clamp of claim 2 wherein said lower fastener mechanism is a lower nut secured to said second inwardly extending lower leg.

4. The clamp of claim 3 wherein said lower nut is welded to said second inwardly extending lower leg.

5. The clamp of claim 1 wherein said fastener mechanism includes a bolt, a nut and a spring and wherein said bolt passes through a first hole on said first outer jaw plate and a second hole on said second outer jaw plate.

6. The clamp of claim 5 wherein at least one of said first and second holes is square, and wherein said first hole is located on the first main body portion of said first outer jaw, and said second hole is located on said second main body portion of said second outer jaw.

7. The clamp of claim 5 wherein said fastener mechanism further includes a spacer, configured to prevent said first outer jaw plate and second outer jaw plate from deforming the grid rail.

8. The clamp of claim 7 wherein the spacer is located around the bolt, and the spring is located around the spacer.

9. The clamp of claim 1 further including a second inner jaw plate, and wherein said first and second inner jaw plates are assembled in a mirrored arrangement of each other, with the upper legs facing each other and each having a hole through which a bolt of said fastener mechanism passes.

10. The clamp of claim 9 wherein one said first and second inner jaw plates includes a rectangular hole and the other of said first and second inner jaw includes a round hole.

11. The clamp of claim 9 wherein said jaw plates include a protective coating.

12. The clamp of claim 9 having a lateral axis and a perpendicular longitudinal axis, wherein the longitudinal length of said first and second outer jaw plates are at least three times the lateral length of each of the first and second upper inwardly extending legs and wherein said fastener mechanism has an fastener axis aligned laterally.

13. The clamp of claim 12 further including a hanger bolt having a hanger bolt axis and wherein said hanger bolt is coupled to said lower fastener mechanism and wherein the hanger bolt axis is perpendicular to both said lateral axis and said longitudinal axis.

* * * * *